(12) United States Patent
Takasumi

(10) Patent No.: US 7,969,483 B2
(45) Date of Patent: Jun. 28, 2011

(54) WHITE BALANCE CONTROL METHOD, IMAGING APPARATUS AND STORAGE MEDIUM STORING WHITE BALANCE CONTROL PROGRAM

(75) Inventor: Shinya Takasumi, Akiruno (JP)

(73) Assignee: Olympus Imaging Corp., Tokyo (JP)

( * ) Notice: Subject to any disclaimer, the term of this patent is extended or adjusted under 35 U.S.C. 154(b) by 1086 days.

(21) Appl. No.: 11/800,573

(22) Filed: May 7, 2007

(65) Prior Publication Data

US 2007/0268380 A1 Nov. 22, 2007

(30) Foreign Application Priority Data

May 11, 2006 (JP) ................................. 2006-132855

(51) Int. Cl.
*H04N 9/73* (2006.01)
*H04N 5/228* (2006.01)
*H04N 5/235* (2006.01)
*H04N 5/76* (2006.01)

(52) U.S. Cl. ............... 348/224.1; 348/222.1; 348/223.1; 348/229.1; 348/231.3

(58) Field of Classification Search .... 348/222.1–225.1, 348/229.1, 231.1–231.3
See application file for complete search history.

(56) References Cited

U.S. PATENT DOCUMENTS

| | | | | |
|---|---|---|---|---|
| 5,504,525 A * | 4/1996 | Suzuki | ........................ | 348/223.1 |
| 5,805,213 A * | 9/1998 | Spaulding et al. | ......... | 348/222.1 |
| 6,665,434 B1 | 12/2003 | Yamaguchi | | |
| 6,795,115 B1 * | 9/2004 | Okazaki | ..................... | 348/223.1 |
| 7,146,040 B2 * | 12/2006 | Johannesson et al. | ........ | 382/167 |
| 7,423,779 B2 | 9/2008 | Shi | | |
| 7,532,239 B2 | 5/2009 | Hayaishi | | |
| 7,725,017 B2 * | 5/2010 | Tamura | ........................... | 396/91 |
| 7,868,943 B2 * | 1/2011 | Yamamoto | ..................... | 348/345 |
| 2002/0106206 A1 * | 8/2002 | Takeshita | ....................... | 396/429 |
| 2002/0167596 A1 * | 11/2002 | Suzuki et al. | .............. | 348/223.1 |
| 2004/0012690 A1 * | 1/2004 | Makioka | .................... | 348/222.1 |

(Continued)

FOREIGN PATENT DOCUMENTS

CN 1678081 10/2005

(Continued)

OTHER PUBLICATIONS

Translation of Text of the First Office Action for Chinese Application No. 2007101074233, issued Nov. 13, 2009 (2 pgs.).

*Primary Examiner* — Jason Chan
*Assistant Examiner* — Michael Osinski
(74) *Attorney, Agent, or Firm* — John C. Pokotylo; Straub & Pokotylo

(57) ABSTRACT

There is provided a white balance control method. A color space coordinate expressing a color signal of each divided block is transformed into a white balance determination space coordinate. A light source estimation area and a high-saturation determination area are set in a white balance determination space to which the transformed white balance determination space coordinate belongs. A kind of the light source is estimated based on a white balance determination space coordinate distribution in the light source estimation area. A kind of the light source is determined based on the estimated kind of the light source and a white balance determination space coordinate distribution in the high-saturation determination area. White balance control information is calculated based on the determined kind of the light source. White balance control with respect to an image signal is carried out based on the calculated white balance control information.

5 Claims, 5 Drawing Sheets

U.S. PATENT DOCUMENTS

| | | | |
|---|---|---|---|
| 2004/0095478 A1* | 5/2004 | Takano et al. | 348/223.1 |
| 2004/0119843 A1* | 6/2004 | Hoshuyama | 348/222.1 |
| 2004/0201727 A1* | 10/2004 | Ichikawa et al. | 348/223.1 |
| 2004/0201766 A1* | 10/2004 | Funston et al. | 348/333.02 |
| 2004/0257454 A1* | 12/2004 | Pinto et al. | 348/222.1 |
| 2005/0068428 A1* | 3/2005 | Uchida | 348/231.3 |
| 2005/0253934 A1* | 11/2005 | Yamagishi et al. | 348/222.1 |
| 2005/0286097 A1* | 12/2005 | Hung et al. | 358/509 |
| 2007/0024719 A1* | 2/2007 | Sakurai | 348/223.1 |
| 2008/0143846 A1 | 6/2008 | Shi | |
| 2008/0143847 A1 | 6/2008 | Shi | |
| 2008/0143848 A1 | 6/2008 | Shi | |
| 2008/0143849 A1 | 6/2008 | Shi | |
| 2008/0143850 A1 | 6/2008 | Shi | |
| 2008/0143851 A1 | 6/2008 | Shi | |

FOREIGN PATENT DOCUMENTS

| | | |
|---|---|---|
| CN | 1692656 | 11/2005 |
| JP | 2005-136854 | 5/2005 |

* cited by examiner

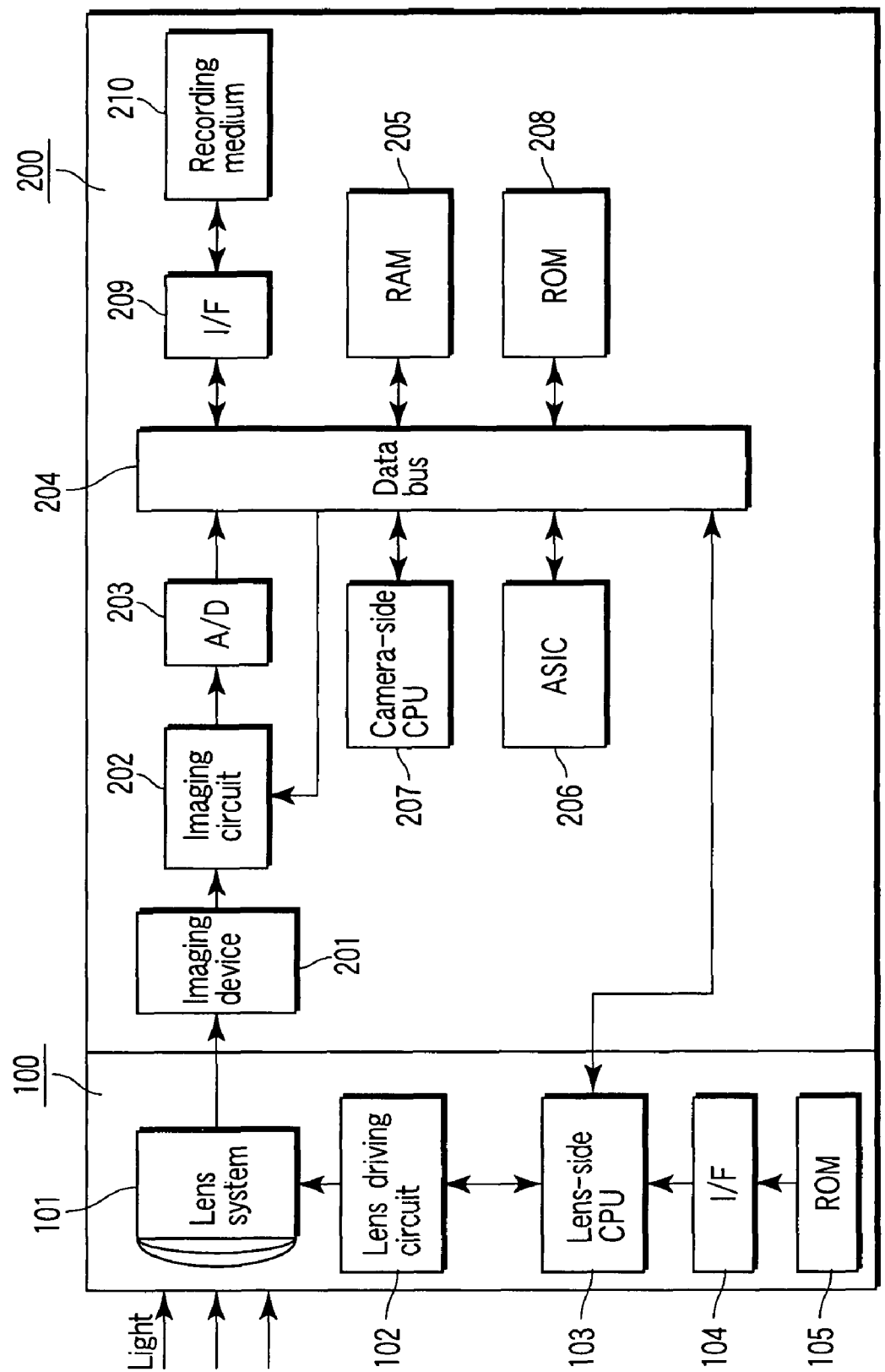
F I G. 1

Color signal = Color space coordinate (Rm, Gm, Bm)

White balance determination space coordinate
i1m = Rm/Gm
i2m = Bm/Gm
i3m = Gm

US 7,969,483 B2

WHITE BALANCE CONTROL METHOD, IMAGING APPARATUS AND STORAGE MEDIUM STORING WHITE BALANCE CONTROL PROGRAM

CROSS-REFERENCE TO RELATED APPLICATIONS

This application is based upon and claims the benefit of priority from prior Japanese Patent Application No. 2006-132855, filed May 11, 2006, the entire contents of which are incorporated herein by reference.

BACKGROUND OF THE INVENTION

1. Field of the Invention

The present invention relates to a white balance control method, an imaging apparatus capable of carrying out white balance control, and a storage medium storing a white balance control program.

2. Description of the Related Art

According to a white balance control method, white balance control is carried out using an image color signal. For example, the following white balance control method is given. According to the white balance control method, a light source is determined based on a color signal captured by an imaging device to carry out white balance control. According to the white balance control method using the foregoing color signal, the color signal is separated into a luminance signal and a color difference signal. Whether a scene is indoors or outdoors is distinguished based on the luminance signal to determine a light source. Saturation is determined based on the color difference signal, and thus, white balance control is carried out using the color signal having low saturation.

Jpn. Pat. appln. KOKAI Publication No. 2005-136854 discloses the following white balance control. According to this white balance control, a low saturation color signal in the color signal captured by the imaging device is integrated. Based on the integrated result, white balance control is carried out.

BRIEF SUMMARY OF THE INVENTION

According to a first aspect of the invention, there is provided a white balance control method of carrying out white balance control using a color signal of each of several blocks obtained by dividing an image signal equivalent to one frame in a screen, comprising: transforming a color space coordinate expressing the color signal of each divided block into a white balance determination space coordinate for determining a white balance in the screen; setting a light source estimation area for estimating a kind of a light source in the white balance control and a high-saturation determination area for determining whether or not the color signal of each block in the screen has high saturation, in a white balance determination space to which the transformed white balance determination space coordinate belongs; estimating a kind of the light source based on a white balance determination space coordinate distribution in the light source estimation area; determining a kind of the light source based on the estimated kind of the light source and a white balance determination space coordinate distribution in the high-saturation determination area; calculating a white balance control information based on the determined kind of the light source; and carrying out white balance control with respect to the image signal based on the calculated white balance control information.

According to a second aspect of the invention, there is provided an imaging apparatus comprising: an imaging unit which images an object to capture an imaging signal equivalent to one frame; a dividing unit which divides the imaging signal into several blocks in a screen; a coordinate transformation unit which transforms a color space coordinate expressing a color signal of the divided each block into a white balance determination space coordinate for determining a white balance in the screen; a storage unit which stores a white balance control information set for each specific light source; a determination unit which determines whether the imaging apparatus is a lens detachable type; a reading unit which reads the stored white balance control information when it is determined that the imaging apparatus is not a lens detachable type; a setting unit which sets a light source estimation area for estimating a kind of light source in the white balance control and a high-saturation determination area for determining whether or not a color signal of each block in the screen has high saturation, in a white balance determination space based on the read white balance control information and the transformed white balance determination space coordinate; a light source estimation unit which estimates the kind of the light source based on a white balance determination space coordinate distribution in the light source estimation area; a determination unit which determines a kind of the light source based on the estimated kind of the light source and a white balance determination space coordinate distribution in the high-saturation determination area; a white balance control information calculation unit which calculates a white balance control information based on the determined kind of the light source; and a white balance control unit which carries out white balance control with respect to the image signal based on the calculated white balance control information.

According to a third aspect of the invention, there is provided an imaging apparatus comprising: an imaging unit which images an object to capture an imaging signal equivalent to one frame; a dividing unit which divides the imaging signal into several blocks in a screen; a coordinate transformation unit which transforms a color space coordinate expressing a color signal of the divided each block into a white balance determination space coordinate for determining a white balance in the screen; a first storage unit which stores a characteristic information of the imaging unit; a photographing lens freely detachable with respect to the imaging apparatus, the photographing lens having a second storage unit which stores a characteristic information of the photographing lens; a third storage unit which stores a characteristic information for each specific light source; a determination unit which determines whether the imaging apparatus is a lens detachable type; a reading unit which reads the characteristic information of the imaging unit, characteristic information of the photographing lens and characteristic information for each specific light source when it is determined that the imaging apparatus is a lens detachable type; a calculation unit which calculates a white balance control information corresponding to each specific light source based on the read characteristic information of the imaging unit, characteristic information of the photographing lens and characteristic information of each specific light source; a setting unit which sets a light source estimation area for estimating a kind of light source in the white balance control and a high-saturation determination area for determining whether or not a color signal of each block in the screen has high saturation, in a white balance determination space based on the calculated white balance control information and the transformed white balance determination space coordinate; a light source estimation unit which estimates a kind of the light source based on a white balance determination space coordinate distribution in the light source estimation area; a light source determination unit which determines a kind of the light source based on the estimated kind of the light source and a white balance determination space coordinate distribution in the high-saturation determination area; a white balance control information calculating unit which calculates a white balance control information based on the determined kind of the light source; and a white balance control unit which carries out white balance control with respect to the image signal based on the calculated white balance control information.

According to a fourth aspect of the invention, there is provided a computer readable storage medium including a white balance control program for carrying out white balance control using a color signal of each of several blocks obtained by dividing an image signal equivalent to one frame in a screen, the program instructions for: performing function transforming a color space coordinate expressing the color signal of each divided block into a white balance determination space coordinate for determining a white balance in the screen; performing function setting a light source estimation area for estimating a kind of a light source in the white balance control and a high-saturation determination area for determining whether or not the color signal of each block in the screen has high saturation, in a white balance determination space to which the transformed white balance determination space coordinate belongs; performing function estimating a kind of the light source based on a white balance determination space coordinate distribution in the light source estimation area; performing function determining a kind of the light source based on the estimated kind of the light source and a white balance determination space coordinate distribution in the high-saturation determination area; performing function calculating a white balance control information based on the determined kind of the light source; and performing function carrying out white balance control with respect to the image signal based on the calculated white balance control information.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing the configuration of a digital camera given as one example of an imaging apparatus for carrying out a white balance control method according to one embodiment of the present invention;

DETAILED DESCRIPTION OF THE INVENTION

Figure 2:
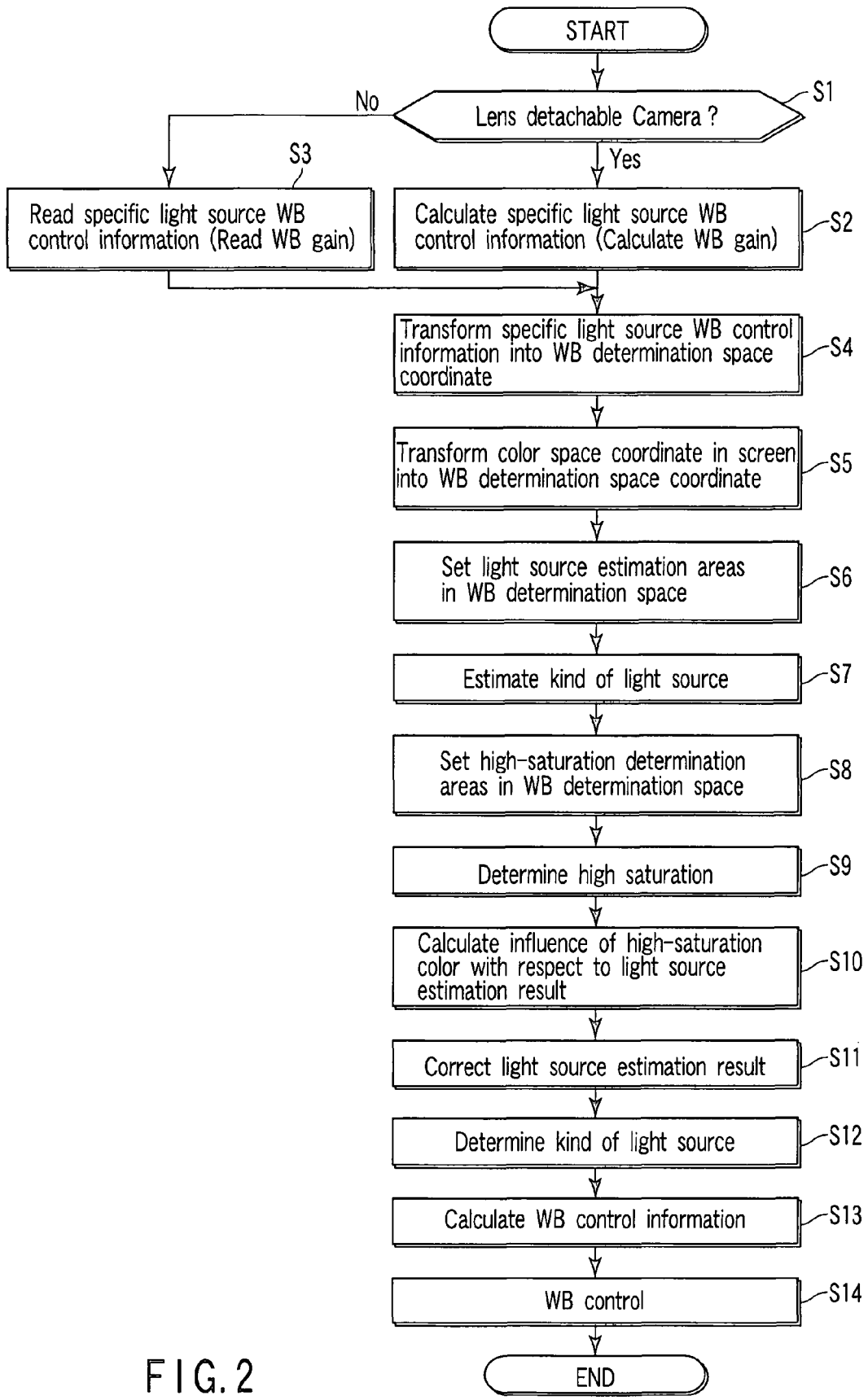
FIG. 2 is a flowchart to explain the flow of procedures of the white balance control method according to one embodiment of the present invention.

One embodiment of the present invention will be hereinafter described with reference to the accompanying drawings.

FIG. 1 is a block diagram showing the configuration of a digital camera given as one example of an imaging apparatus for carrying out a white balance control method according to one embodiment of the present invention. A digital camera shown in FIG. 1 includes a photographing lens 100 and a camera body 200 configured so that the photographing lens 100 is freely detachable.

The photographing lens 100 includes lens system 101, lens driving circuit 102, lens-side CPU 103, interface (I/F) 104 and ROM 105.

The lens system 101 is composed of several lenses and a lens actuator actuating lenses. The lens system 101 collects lights from an object (not shown) into an imaging device 201 built in the camera body 200. The lens driving circuit 102 actuates a lens actuator of the lens system 101 to perform focusing and zooming of the digital camera.

The lens-side CPU 103 is connected to make communications with a camera-side CPU 207 built in the digital camera when the photographing lens 100 is attached to the camera body 200. Under the control of the camera-side CPU 207 built in the camera body 200, components such as lens driving circuit 102 included in the photographing lens 100 are controlled. The interface 104 is a communication interface used when the lens-side CPU 103 reads data stored in the ROM 105. The ROM 105 used as a second storage is stored with various data relevant to the lens system 101 such as spectral transmittance characteristic data and focal distance data.

The camera body 200 includes imaging device 201, imaging circuit 202, A/D converter circuit 203, data bus 204, RAM 205, ASIC 206, camera-side CPU 207, ROM 208, interface (I/F) 209 and recording medium 210.

The imaging device 201 is an imaging device, which is provided with a Bayer array color filter. The imaging device 201 receives lights from an object incident via the photographing lens 100 to convert it into an electric signal (imaging signal). The imaging circuit 202 pre-processes the imaging signal from the imaging device 201, and thereafter, outputs it to the A/D converter circuit 203. The A/D converter circuit 203 converts the pre-processed imaging signal output from the imaging circuit 202 into a digital signal to obtain image data.

The data bus 204 is used as mediation of various data such as image data output from the A/D converter circuit 203. The RAM 205 temporarily stores various data such as image data obtained via the A/D converter circuit 203 and white balance control information, described later. The ASIC 206, which is a white balance controller, subjects the image data stored in the RAM 205 and output from the A/D converter circuit 203 to various image processings, such as white balance control. The camera-side CPU 207, which is a calculator, calculates various data such as white balance control information used for white balance control in the ASIC 206. Moreover, the camera-side CPU 207 controls the operation of each circuit of the digital camera.

The ROM 208 given as a first and third storage stores the following programs and parameters. One is a white balance control information calculation program and parameter for calculating white balance control information (white balance gain). Another is a white balance control program for carrying out white balance control. Another is a program and parameter relevant to various controls of the digital camera. The camera-side CPU 207 reads programs and parameters stored in the ROM 208 via the data bus 204 to execute various processings.

According to this embodiment, the following data is stored in the ROM 208 as the white balance control information calculation parameter. One is spectral sensitivity characteristic data of the imaging device 201, and another is spectral radiation luminance data for each specific light source. The specific light source is a light source such as sunlight or an electric bulb, the color temperatures of which are known.

The digital camera shown in FIG. 1 is composed of a freely detachable photographing lens 100 and camera body 200, which are independently configured. The white balance control method of this embodiment is applicable to a so-called compact digital camera such that the lens system 101 is built in the camera. In this case, the ROM 208 may be stored with white balance control information (white balance gain) for each specific light source. In other words, if the photographing lens 100 is built in, white balance control information is previously calculated.

The interface 209 is a communication interface between the data bus 204 and the recording medium 210. The recording medium 210 is a medium for recording images processed by the ASIC 206. As the recording medium 210, various media are usable.

The operation of the digital camera, including the white balance control method, according to one embodiment will be hereinafter described.

Light incident on the lens system 101 from an object (not shown) is collected onto the imaging device 201 built in the camera body 200. Then, the imaging device 201 outputs an imaging signal in accordance with the incident light. Thereafter, the imaging circuit 202 carries out various pre-processes such as noise removal and amplification. The imaging signal processed by the imaging circuit 202 is converted into a digital signal (image data) by the A/D converter circuit 203. Then, the image data is stored in the RAM 205 via the data bus 204.

The image data is stored in the RAM 205, and thereafter, the camera-side CPU 207 calculates white balance control information. Based on the white balance control information, the ASIC 206 carries out white balance control with respect to the image data read from the RAM 205. The ASIC 206 carries out image processings such as color and gray level transformation in addition to white balance control. When the image data is recorded, the processed image data is compressed, and thereafter, stored in the RAM 205. Thereafter, the compressed image data stored in the RAM 205 is read via the interface 209, and then, recorded in the recording medium 210.

The following is an explanation about the white balance control method according to one embodiment. FIG. 2 is a flowchart to explain the flow of procedures of the white balance control method according to one embodiment. The flowchart of FIG. 2 is applicable to white balance control in a digital camera configured in a manner that the photographing lens is built in the camera body 200.

The camera-side CPU 207 determines whether or not the camera is configured so that the photographing lens 100 is freely detachable (step S1). In step S1, if the photographing lens is configured to be freely detachable, the camera-side CPU 207 reads the following data to calculate white balance control information for each specific light source (step S2). One is spectral transmittance characteristic data of the lens system 101 read from the ROM 105. Another is spectral sensitivity characteristic data of the imaging device 201 and spectral radiation luminance data of each specific light source read from the ROM 208. In this case, white balance control information is calculated via a conventional method. For example, the foregoing data, that is, spectral sensitivity characteristic data of the imaging device 201, spectral transmittance characteristic data of the lens system 101 and spectral radiation luminance data every specific light source are integrated. By doing so, spectral sensitivity with respect to R, G and B is obtained in a state that the photographing lens 100 is attached. Thus, the white balance control information is calculated from the spectral sensitivities of R, G and B. Specifically, white balance information relevant to R is calculated from G spectral sensitivity/R spectral sensitivity. Moreover, white balance information relevant to B is calculated from G spectral sensitivity/B spectral sensitivity.

In step S1, if the photographing lens is not configured to be freely detachable, the camera-side CPU 207 reads white balance control information of each specific light source previously stored in the ROM 208 (step S3).

In either steps S2 or step S3, white balance control information for each specific light source is acquired. Thereafter, the camera-side CPU 207 transforms the white balance control information of each specific light source into a white balance determination space coordinate described later (step S4). Thereafter, the camera-side CPU 207 reads image data stored in the RAM 205 to divide it into several blocks. By doing so, a color space coordinate expressing a color signal for each divided block is obtained. The CPU 207 transforms the color space coordinate obtained for each block into the white balance determination space coordinate (step S5).

Figure 3:
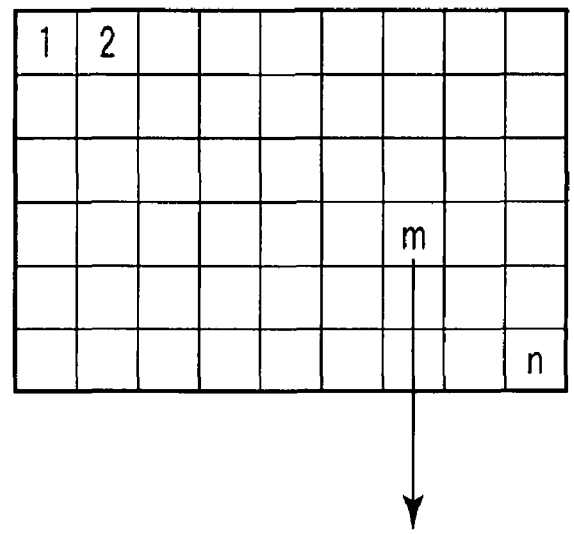
FIG. 3 is a conceptual view showing a state that image data is divided into n blocks.
Figure 4:
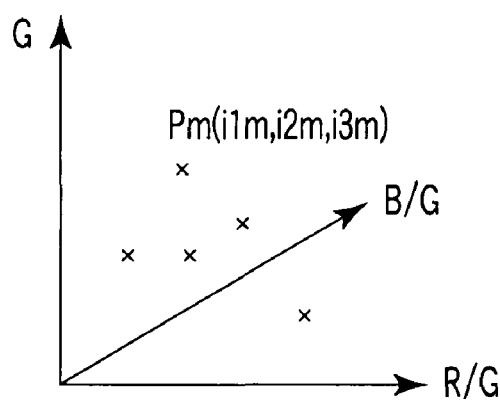
FIG. 4 is a graph to explain a white balance determination space coordinate.

Coordinate transformation between a color space coordinate and a white balance determination space will be explained below. FIG. 3 is a conceptual view showing that image data is divided into n blocks. FIG. 4 is a graph to explain a white balance determination space.

Color space coordinates (Rm, Gm, Bm) for expressing a color signal of block m shown in FIG. 3 are obtained in the following manner. The color space coordinates obtained from each pixel in block m is averaged for each color component. If the pixel array of the imaging device 201 is a Bayer array, four components, that is, R, Gr, Gb and B exist in one block. Therefore, Gm is set as ½ of the sum of average values of Gr and Gb signals.

The foregoing defined transformation from color space coordinate into white balance determination space is set as a ratio of R, B to G in every block (i.e., white balance every block). In other words, the transformation from a color space coordinate (Rm, Gm, Bm) into a white balance determination space (i1$m$, i2$m$, i3$m$) is made based on the following equation (1).

$$i1m = Rm/Gm$$

$$i2m = Bm/Gm$$

$$i3m = Gm \qquad (1)$$

In order to transform the white balance control information of each specific light source into the white balance determination space coordinate, the reciprocals of the white balance control information for each specific light source is calculated.

In step S5, coordinate transformation shown in the equation (1) is made with respect to all blocks in a screen. Thereafter, the camera-side CPU 207 sets a light source estimation area in the white balance determination space (step S6).

Figure 5A:
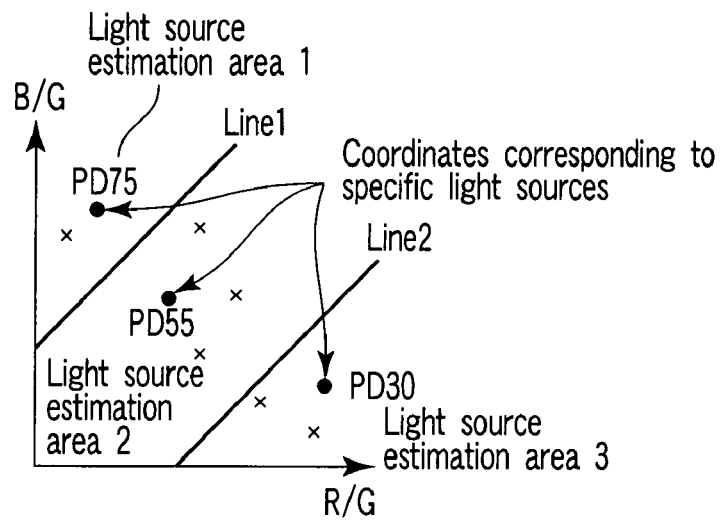
FIG. 5A, FIG. 5B and FIG. 5C are views to explain light source estimation areas.
Figure 5B:
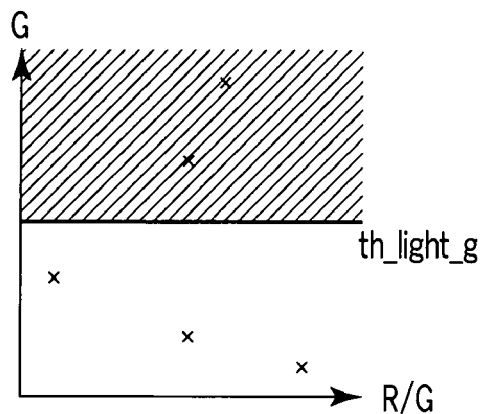
Figure 5C:
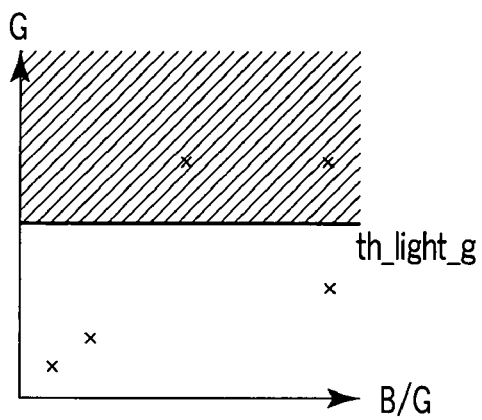

The foregoing light source estimation area settings of step S6 will be explained in detail. FIG. 5A to FIG. 5C shows the light source estimation area. FIG. 5A is a plan view showing a white balance determination space using the R/G axis and B/G axis. FIG. 5B is a plan view showing white balance determination space using the R/G axis and G axis. FIG. 5C is a plan view showing white balance determination space using B/G axis and G axis.

Via the procedure of step S4, white balance determination space coordinates corresponding to specific light sources are set in the white balance determination space. In FIG. 5A, coordinates PD75, PD55 and PD30 corresponding to three light sources are set. PD75 (X_PD75, Y_PD75) is a coordinate corresponding to a light source having a color temperature of 7500K (e.g., a bluish light source such as that present in the shade of sunlight). PD55 (X_PD55, Y_PD55) is a coordinate corresponding to a light source having a color temperature of 5500K (e.g., bright sunlight). PD30 (X_PD30, Y_PD30) is a coordinate corresponding to a light source having a color temperature of 3000K (e.g., a reddish light source such as an electric bulb).

In the manner described above, the white balance determination space coordinate for each specific light source is set. In this state, straight lines for setting the light source estimation areas are set on the plane using an R/G axis and B/G axis. In FIG. 5A, two straight lines, Line 1 and Line 2 are set to three light source estimation areas, which correspond to three light sources. Line 1 has a predetermined gradient, and is a straight line passing between PD75 and PD55. On the other hand, Line 2 has the same gradient as Line 1, and is a straight line passing between PD55 and PD30. The method of setting Line 1 and Line 2 will be explained below. Line 1 is expressed by the following linear equation.

$$Y=mX+c\_7\_5 \text{ (where, } X=R/G, Y=B/G)  \quad (2)$$

The Y intercept $c\_7\_5$ of Line 1 thus defined is set as a coordinate corresponding to 6000K between 7500K and 5500K. In other words, when Line 1 passes through a white balance determination space coordinate (X_PBDR_7_5, Y_PBDR_7_5) corresponding to 6000K, this coordinate divides PD75 and PD55 into 3:1. Thus, the following relationship is established.

$$X\_PBDR\_7\_5 = (1 \times X\_PD\_75 + 3 \times X\_PD\_55)/4$$

$$Y\_PBDR\_7\_5 = (1 \times Y\_PD\_75 + 3 \times Y\_PD\_55)/4 \quad (3)$$

Therefore, the Y intercept $c\_7\_5$ is obtained from the following equation (4).

$$\begin{aligned} c\_7\_5 &= Y\_PBDR\_7\_5 - m \times X\_PBDR\_7\_5 \\ &= (Y\_PD\_75 + 3 \times Y\_PD\_55)/4 - m \times \\ &\quad (X\_PD\_75 + 3 \times X\_PD\_55)/4 \end{aligned} \quad (4)$$

The gradient m is set as 0.9, for example. The gradient m is set as 0.9, and thereby, Line 1 is approximately orthogonal to a segment expressing a black-body radiation locus.

Next, Line 2 is set. Line 2 is expressed by the following linear equation (5).

$$Y=mX+c\_5\_3 \text{ (where, } X=R/G, Y=B/G) \quad (5)$$

The Y intercept $c\_5\_3$ of Line 2 thus defined is set as a coordinate corresponding to 4000K between 5500K and 3000K. In other words, when Line 2 passes through a white balance determination space coordinate (X_PBDR_5_3, Y_PBDR_5_3) corresponding to 4000K, this coordinate divides PD55 and PD30 into 3:2. Thus, the following relationship is established.

$$X\_PBDR\_5\_3 = (2 \times X\_PD\_55 + 3 \times X\_PD\_30)/5$$

$$Y\_PBDR\_5\_3 = (2 \times Y\_PD\_55 + 3 \times Y\_PD\_30)/5 \quad (6)$$

Therefore, the Y intercept $c\_5\_3$ is obtained from the following equation (7)

$$\begin{aligned} c\_5\_3 &= Y\_PBDR\_5\_3 - m \times X\_PBDR\_5\_3 \\ &= (Y\_PD\_55 + 3 \times Y\_PD\_30)/4 - m \times \\ &\quad (X\_PD\_55 + 3 \times X\_PD\_30)/4 \end{aligned} \quad (7)$$

In the manner described above, the plane using the R/G axis and B/G axis is divided into three areas. Thereafter, luminance determination threshold values th_light_g shown in FIG. 5B and FIG. 5C are set. This th_light_g is set based on a G signal having the most luminance information in color signals. This th_light_g is expressed by the following equation (8).

$$th\_light\_g = G\_ave \quad (8)$$

In the foregoing equation (8), G_ave is an average value i3 of the white balance determination space coordinate equivalent to one frame. The luminance determination threshold values th_light_g is not always set. However, the luminance determination threshold values th_light_g is set, and thereby, the following advantage is given. Specifically, even if the exposure condition in photographing changes when the light source is determined later, the same light source determination result is always obtained.

As described above, Line 1, Line 2 and th_light_g are set, and thereafter, a light source estimation area for each specific light source is set. As depicted in FIG. 5A to FIG. 5C, the light source estimation area 1 is an area satisfying the following condition. That is, G is more than th_light_g, and B/G is more than Line 1 on the plane using the R/G axis and B/G axis. The light source estimation area 2 is an area satisfying the following condition. That is, G is more than th_light_g, and B/G is less than Line 1 and more than Line 2 on the plane using the R/G axis and B/G axis. The light source estimation area 3 is an area satisfying the following condition. That is, G is more than th_light_g, and B/G is less than Line 2 on the plane using the R/G axis and B/G axis.

In step S6, after setting the light source estimation areas, the camera-side CPU 207 estimates a light source currently illuminating an object to carry out white balance control (step S7). In order to estimate the light source, an average coordinate (X_ave, Y_ave) of a white balance determination space coordinate existing in light source estimation areas 1 to 3 is calculated. From the position of the calculated average coordinate (X_ave, Y_ave), the light source is estimated. Specifically, if the average coordinate (X_ave, Y_ave) belongs to the light source estimation area 1, the main color of the image captured by the imaging device 201 is blue. Therefore, the light source is estimated as a light source of 7500K. Likewise, if the average coordinate (X_ave, Y_ave) belongs to the light source estimation area 2, the light source is estimated as a light source of 5500K. Moreover, if the average coordinate (X_ave, Y_ave) belongs to the light source estimation area 3, the light source is estimated as a light source of 3000K.

In step S7, the light source is estimated, and thereafter, the camera-side CPU 207 sets high-saturation determination areas in the white balance determination space (step S8).

Figure 6A:
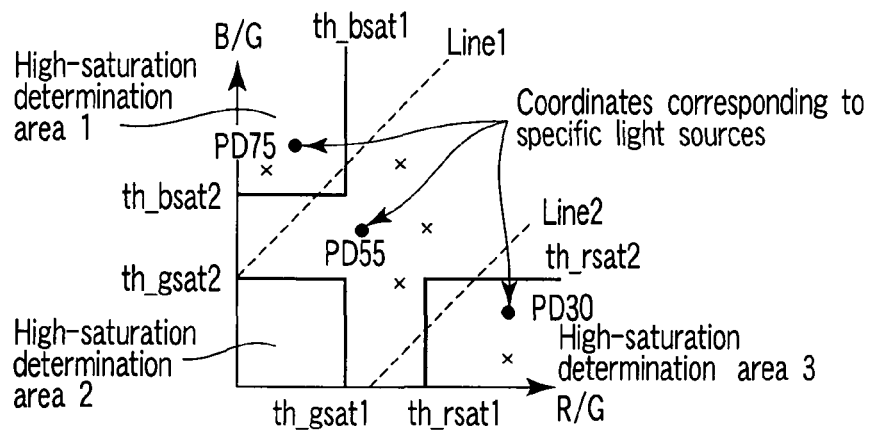
FIG. 6A, FIG. 6B and FIG. 6C are views to explain high saturation determination areas.
Figure 6B:
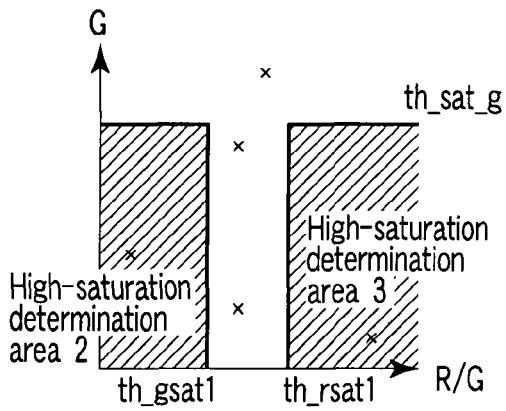
Figure 6C:
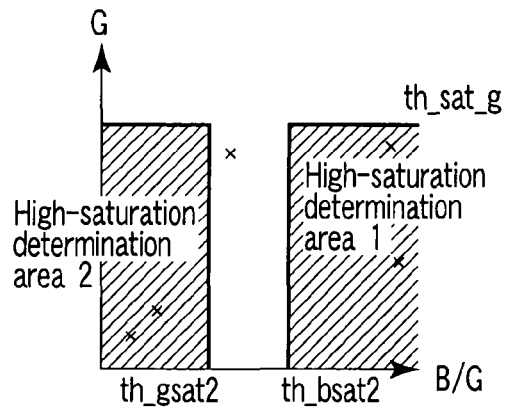

The procedures of setting the high-saturation determination areas in step S8 will be explained below. FIG. 6A to FIG. 6C is a view showing a high-saturation determination area. FIG. 6A is a plan view showing a white balance determination space using the R/G axis and B/G axis. FIG. 6B is a plan view showing a white balance determination space using the R/G axis and G axis. FIG. 6C is a plan view showing a white balance determination space using the B/G axis and G axis.

The high-saturation determination area is set for each hue in the following manner. The area overlaps with at least one of the light source estimation areas (divided by the broken line in FIG. 6A) set for each specific light source. As described above, the high-saturation determination area is set to overlap with the light source estimation area. By doing so, a high-saturation color in a screen determines the influence given to light source estimation.

When the high-saturation areas are set, six straight lines defined by the following equation (9) are set on the plane using the R/G axis and B/G axis.

$$th\_rsat1 = 0.7 \times X\_PD30$$

$$th\_rsat2 = 1.3 \times Y\_PD30$$

$$th\_gsat1 = 0.8 \times X\_PD55$$

$$th\_gsat2 = 0.7 \times Y\_PD55$$

$$th\_bsat1 = 1.2 \times X\_PD75$$

$$th\_bsat2 = 0.8 \times Y\_PD75 \qquad (9)$$

The coefficient of the equation is one example. Moreover, the threshold value th_sat_g is set on the G axis. This th_sat_g is set by the following equation (10) when the maximum value of i3 of the white balance determination space equivalent to one frame is set as G_max.

$$th\_sat\_g = (G\_ave + G\_max)/2 \qquad (10)$$

Based on the foregoing set th_rsat1, th_rsat2, th_gsat1, th_gsat2, th_bsat1 and th_bsat2, a high-saturation determination area for each hue is set. Here, as shown in FIG. 6A to FIG. 6C, a high-saturation determination area 1 is an area satisfying the following condition. That is, G is less than th_sat_g, and R/G is less than th_bsat1 and B/G is more than th_bsat2 on the R/G axis and B/G axis. A high-saturation determination area 2 is an area satisfying the following condition. That is, G is less than th_sat_g, and R/G is less than th_gsat1 and B/G is less than th_gsat2 on the R/G axis and B/G axis. A high-saturation determination area 3 is an area satisfying the following condition. That is, G is less than th_sat_g, and R/G is more than th_rsat1 and B/G is less than th_rsat2 on the R/G axis and B/G axis.

In step S8, after setting high-saturation areas, the camera-side CPU 207 determines high saturation color of the captured image (step S9). In order to determine the high saturation color, the number of white balance determination space coordinates existing in high-saturation determination areas 1 to 3 set as described in FIG. 6A to FIG. 6C is compared. Ranking of the high-saturation determination areas is given in the order based on highest number of coordinates. In this case, the number of white balance determination space coordinates in the high-saturation determination area 1 is set as cnt_satarea1. The number of white balance determination space coordinates in the high-saturation determination area 2 is set as cnt_satarea2. The number of white balance determination space coordinates in the high-saturation determination area 3 is set as cnt_satarea3. The highest ranking high-saturation determination area is set as satarea_rank1. The next highest ranking high-saturation determination area is set as satarea_rank2. The subsequent highest ranking high-saturation determination area is set as satarea_rank3. For example, if cnt_satarea1=30, cnt_satarea2=0, and cnt_satarea3=70, the following relationship is given.

$$satarea\_rank1 = satarea3$$

$$satarea\_rank2 = satarea1$$

$$satarea\_rank3 = satarea2$$

In this case, a reddish high saturation is the prevalently saturated color in a screen.

In step S9, after determining a high saturation color, the camera-side CPU 207 calculates the influence of high saturation color on the light source estimation result (step S10). For this purpose, a ratio of the number of white balance determination space coordinates in each high-saturation determination area to all the blocks of one frame is calculated. In this case, the ratio of the high-saturation determination area 1 is set as ratio_sat1. The ratio of the high-saturation determination area 2 is set as ratio_sat2. The ratio of the high-saturation determination area 3 is set as ratio_sat3. The number of all the blocks of one frame is set as cnt_blkall. Each ratio is obtained from the following equation (11)

$$ratio\_sat1 = cnt\_satarea1/cnt\_blkall$$

$$ratio\_sat2 = cnt\_satarea2/cnt\_blkall$$

$$ratio\_sat3 = cnt\_satarea3/cnt\_blkall \qquad (11)$$

The number of white balance determination space coordinates is compared in an area overlapping the light source estimation area with high-saturation determination area. Ranking is given to each overlapping area in the order based on highest number of coordinates. In FIG. 5A, an overlapping area 1 is an area of th_light_g≦G≦th_sat_g and R/G≦th_bsat1 and B/G≧th_bsat2. An overlapping area 2 is an area of th_light_g≦G≦th_sat_g and R/G≦th_gsat1 and B/G≦th_gsat2. An overlapping area 3 is an area of th_light_g≦G≦th_sat_g and R/G≧th_rsat1 and B/G≦th_rsat2. Moreover, the number of white balance determination space coordinates in the overlapping area 1 is set as cnt_overlaparea1. The number of white balance determination space coordinates in the overlapping area 2 is set as cnt_overlaparea2. The number of white balance determination space coordinates in the overlapping area 3 is set as cnt_overlaparea3. The highest ranking overlapping area is set as overlaparea_rank1, the next highest ranking overlapping area is set as overlaparea_rank2, and the subsequent highest ranking overlapping area is set as overlaparea_rank3. For example, if cnt_overlaparea1=15, cnt_overlaparea2=0, and cnt_overlaparea3=35, the following relationship is given.

$$overlaparea\_rank1 = overlaparea3$$

$$overlaparea\_rank2 = overlaparea1$$

$$overlaparea\_rank3 = overlaparea2$$

A ratio of the number of white balance determination space coordinates in the overlapping area to the number of all blocks of one frame is calculated. Here, the ratio in the overlapping area 1 is set as ratio_overlap1, the ratio in the overlapping area 2 is set as ratio_overlap2, and the ratio in the overlapping area 3 is set as ratio_overlap3. The number of all blocks of one frame is set as cnt_blkall. The following equation (12) is given.

$$\text{ratio\_overlap1} = cnt\_overlaparea1/cnt\_blkall$$

$$\text{ratio\_overlap2} = cnt\_overlaparea2/cnt\_blkall$$

$$\text{ratio\_overlap3} = cnt\_overlaparea3/cnt\_blkall \quad (12)$$

If the ratio is high, the influence of the corresponding color on the screen is high.

After the procedure of step S10, the camera-side CPU 207 corrects the light source estimation result in step S7 (step S11). Thereafter, CPU 207 determines the kind of light source actually illuminating an object (step S12). In accordance with the determination result of the light source, the CPU 207 calculates white balance control information (step S13).

Figure 7:
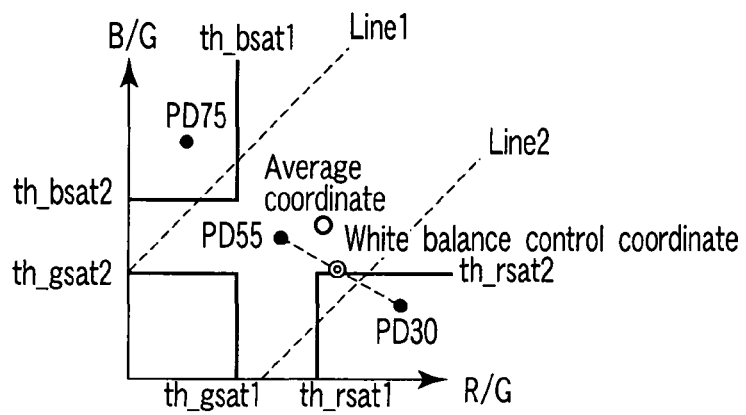
FIG. 7 is a view to explain one example when a light source is determined.

The procedures of steps S11 to S13 will be explained with reference to FIG. 7. For example, an average position (X_ave, Y_ave) of the white balance determination space coordinate calculated in step S7 is shown in FIG. 7. In this case, the foregoing position exists in the light source estimation area 2; therefore, it is estimated that the light source is 5500K. On the other hand, according to the procedure of step S10, satarea_rank1=satarea1, ratio_sat1=0.4, overlaparea_rank1=overlaparea1, ratio_overlap=0.35. In this case, the highest saturated color on the screen is blue. In other words, an area occupied by a blue color object is wide. Therefore, if the actual light source is around 5500K, the average position (X_ave, Y_ave) of the white balance determination space coordinate is near to the light source estimation area 1 from the position shown in FIG. 7. It is considered that the light source estimation result receives an influence of the blue color of the object. Thus, correction is made so that the actual light source is a light source (reddish from 5500K) of a lower temperature than the estimated light source. According to the foregoing correction, a point between 5500K and 3000K is calculated based on the ratio shown by ratio_sat1 and ratio_overlap1. The light source of this point is set as a light source after correction. For simplification, the intermediate point between 5500K and 3000K is simply set as the actual light source.

After the light source is determined, the reciprocal of the white balance determination space coordinate of the light source is calculated to obtain white balance control information (white balance gain).

As described above, after calculating the white balance control information, the camera-side CPU 207 makes communications of white balance control information with the ACIC 206. The ASIC 206 multiplies an R component of the color signal by white balance control information relevant to the R component (white balance R gain). Moreover, the ASIC 206 multiplies a B component of the color signal by white balance control information relevant to the B component (white balance B gain). By doing so, white balance control is carried out (step S14), and thus, the procedures of FIG. 2 end.

As is evident from the foregoing description, according to one embodiment, a light source estimation area and high-saturation determination area are set in the white balance determination space. By doing so, an influence of high saturation to light source estimation is determined. Based on the determination result, the estimation result of the light source is corrected. This serves to preferably carry out white balance control regardless of the result of whether or not low saturation portions exist in the screen.

According to the foregoing embodiment, the ASIC 206 carries out white balance control. For example, the camera-side CPU 207 may carry out the white balance control according to the white balance control program stored in the ROM 208.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A white balance control method of carrying out white balance control using a color signal of each of several blocks obtained by dividing an image signal equivalent to one frame in a screen, comprising:

transforming a color space coordinate expressing the color signal of each divided block into a white balance determination space coordinate for determining a white balance in the screen;

setting a light source estimation area for estimating a kind of a light source in the white balance control and a high-saturation determination area for determining whether or not the color signal of each block in the screen has high saturation, in a white balance determination space to which the transformed white balance determination space coordinate belongs;

estimating the kind of the light source based on a white balance determination space coordinate distribution in the light source estimation area;

determining a kind of the light source based on the estimated kind of the light source and a white balance determination space coordinate distribution in the high-saturation determination area;

calculating a white balance control information based on the determined kind of the light source;

carrying out white balance control with respect to the image signal based on the calculated white balance control information;

determining whether or not an imaging apparatus including an imaging unit capturing the image signal is a lens detachable type;

reading characteristic information of the imaging unit, characteristic information of a lens and characteristic information of each specific light source, which are previously stored, when it is determined that the imaging apparatus is a lens detachable type;

calculating white balance control information of each specific light source based on the read characteristic information; and transforming the calculated white balance control information of each specific light source into the white balance determination space coordinate, wherein the light source estimation area and the high-saturation determination area are set to have an area overlapping each other, and the kind of the light source is determined based on the white balance determination space coordinate distribution in the light source estimation area, the white balance determination space coordinate distribution in the high-saturation determination area and a white balance determination space coordinate distribution in the area overlapping the light source estimation area with the high-saturation determination area, and wherein one or more light source estimation areas are set corresponding to a specific light source, while one or more high-saturation determination areas are set corresponding to hue, and each set light source estimation area has an area mutually overlapping with one or more high-saturation determination areas.

2. A white balance control method of carrying out white balance control using a color signal of each of several blocks obtained by dividing an image signal equivalent to one frame in a screen, comprising:

transforming a color space coordinate expressing the color signal of each divided block into a white balance determination space coordinate for determining a white balance in the screen;

setting a light source estimation area for estimating a kind of a light source in the white balance control and a high-saturation determination area for determining whether or not the color signal of each block in the screen has high saturation, in a white balance determination space to which the transformed white balance determination space coordinate belongs;

estimating the kind of the light source based on a white balance determination space coordinate distribution in the light source estimation area;

determining a kind of the light source based on the estimated kind of the light source and a white balance determination space coordinate distribution in the high-saturation determination area;

calculating a white balance control information based on the determined kind of the light source;

carrying out white balance control with respect to the image signal based on the calculated white balance control information;

determining whether or not an imaging apparatus including an imaging unit capturing the image signal is a lens detachable type;

reading white balance control information set for each specific light source previously stored when it is determined that the imaging apparatus is not a lens detachable type; and transforming the read white balance control information corresponding to each specific light source into the white balance determination space coordinate, wherein the light source estimation area and the high-saturation determination area are set to have an area overlapping each other, and the kind of the light source is determined based on the white balance determination space coordinate distribution in the light source estimation area, the white balance determination space coordinate distribution in the high-saturation determination area and a white balance determination space coordinate distribution in the area overlapping the light source estimation area with the high-saturation determination area, and wherein one or more light source estimation areas are set corresponding to a specific light source, while one or more high-saturation determination areas are set corresponding to hue, and each set light source estimation area has an area mutually overlapping with one or more high-saturation determination areas.

3. An imaging apparatus comprising:

an imaging unit which images an object to capture an imaging signal equivalent to one frame;

a dividing unit which divides the imaging signal into several blocks in a screen;

a coordinate transformation unit which transforms a color space coordinate expressing a color signal of the divided each block into a white balance determination space coordinate for determining a white balance in the screen;

a storage unit which stores a white balance control information set for each specific light source;

a determination unit which determines whether the imaging apparatus is a lens detachable type;

a reading unit which reads the stored white balance control information when it is determined that the imaging apparatus is not a lens detachable type;

a setting unit which sets a light source estimation area for estimating a kind of light source in the white balance control and a high-saturation determination area for determining whether or not a color signal of each block in the screen has high saturation, in a white balance determination space based on the read white balance control information and the transformed white balance determination space coordinate;

a light source estimation unit which estimates the kind of the light source based on a white balance determination space coordinate distribution in the light source estimation area;

a light source determination unit which determines a kind of the light source based on the estimated kind of the light source and a white balance determination space coordinate distribution in the high-saturation determination area;

a white balance control information calculation unit which calculates a white balance control information based on the determined kind of the light source; and a white balance control unit which carries out white balance control with respect to the image signal based on the calculated white balance control information.

4. An imaging apparatus comprising:

an imaging unit which images an object to capture an imaging signal equivalent to one frame;

a dividing unit which divides the imaging signal into several blocks in a screen;

a coordinate transformation unit which transforms a color space coordinate expressing a color signal of the divided each block into a white balance determination space coordinate for determining a white balance in the screen;

a first storage unit which stores a characteristic information of the imaging unit;

a photographing lens freely detachable with respect to the imaging apparatus, the photographing lens having a second storage unit which stores a characteristic information of the photographing lens;

a third storage unit which stores a characteristic information for each specific light source;

a determination unit which determines whether the imaging apparatus is a lens detachable type;

a reading unit which reads the characteristic information of the imaging unit, characteristic information of the photographing lens and characteristic information for each specific light source when it is determined that the imaging apparatus is a lens detachable type;

a calculation unit which calculates a white balance control information corresponding to each specific light source based on the read characteristic information of the imaging unit, characteristic information of the photographing lens and characteristic information of each specific light source;

a setting unit which sets a light source estimation area for estimating a kind of light source in the white balance control and a high-saturation determination area for determining whether or not a color signal of each block in the screen has high saturation, in a white balance determination space based on the calculated white balance control information and the transformed white balance determination space coordinate;

a light source estimation unit which estimates a kind of the light source based on a white balance determination space coordinate distribution in the light source estimation area;

a light source determination unit which determines a kind of the light source based on the estimated kind of the light source and a white balance determination space coordinate distribution in the high-saturation determination area;

a white balance control information calculating unit which calculates a white balance control information based on the determined kind of the light source; and a white balance control unit which carries out white balance control with respect to the image signal based on the calculated white balance control information.

5. The device according to claim 4, wherein the characteristic information of the imaging unit includes a spectral sensitivity characteristic of the imaging unit, and the characteristic information of the photographing lens includes a spectral transmittance characteristic of the photographing lens, and further, the characteristic information of each specific light source includes a spectral radiation luminance characteristic of each specific light source.

* * * * *